F. L. IRWIN.
OPERATING DEVICE FOR DUMP CAR DOORS.
APPLICATION FILED APR. 27, 1908.

906,531.

Patented Dec. 15, 1908
4 SHEETS—SHEET 1.

WITNESSES:

INVENTOR.
Frank L. Irwin
BY
ATTORNEY.

F. L. IRWIN.
OPERATING DEVICE FOR DUMP CAR DOORS.
APPLICATION FILED APR. 27, 1908.

906,531.

Patented Dec. 15, 1908
4 SHEETS—SHEET 3.

WITNESSES:

INVENTOR.
Frank L. Irwin.
BY
ATTORNEY.

F. L. IRWIN.
OPERATING DEVICE FOR DUMP CAR DOORS.
APPLICATION FILED APR. 27, 1908.

906,531.

Patented Dec. 15, 1908.

4 SHEETS—SHEET 4.

WITNESSES:
Q. Rager
Ray Brunhott

INVENTOR.
Frank L. Irwin.
BY
Geo. W. Rightmire
ATTORNEY.

UNITED STATES PATENT OFFICE.

FRANK L. IRWIN, OF COLUMBUS, OHIO, ASSIGNOR TO JOSEPH S. RALSTON, OF COLUMBUS, OHIO.

OPERATING DEVICE FOR DUMP-CAR DOORS.

No. 906,531.     Specification of Letters Patent.     Patented Dec. 15, 1908.

Application filed April 27, 1908. Serial No. 429,384.

REISSUED

*To all whom it may concern:*

Be it known that I, FRANK L. IRWIN, a citizen of the United States, residing at Columbus, in the county of Franklin and State of Ohio, have invented certain new and useful Improvements in Operating Devices for Dump-Car Doors, of which the following is a specification.

My invention relates to operating devices for dump car doors and has especial application to cars in which the doors are hinged near the lower end of the sides of the car and are adapted to be swung outwardly away from the car in order to discharge the lading; in cars of this type the lading may be discharged outside of the track upon which the car is stationed or is moving, and it is desirable that the lading be discharged far enough away so that it will not interfere with the movement of the wheels on the track.

My improvement provides for a positive connection between the door and an operating shaft, of such nature that it may be collapsed or drawn into a folding position when the door is closed, in which position it also locks the door against being opened until the shaft is again rotated for that purpose. The device is therefore extensible, and may be constructed to permit the opening of the door to whatever degree desired.

Figure 1:
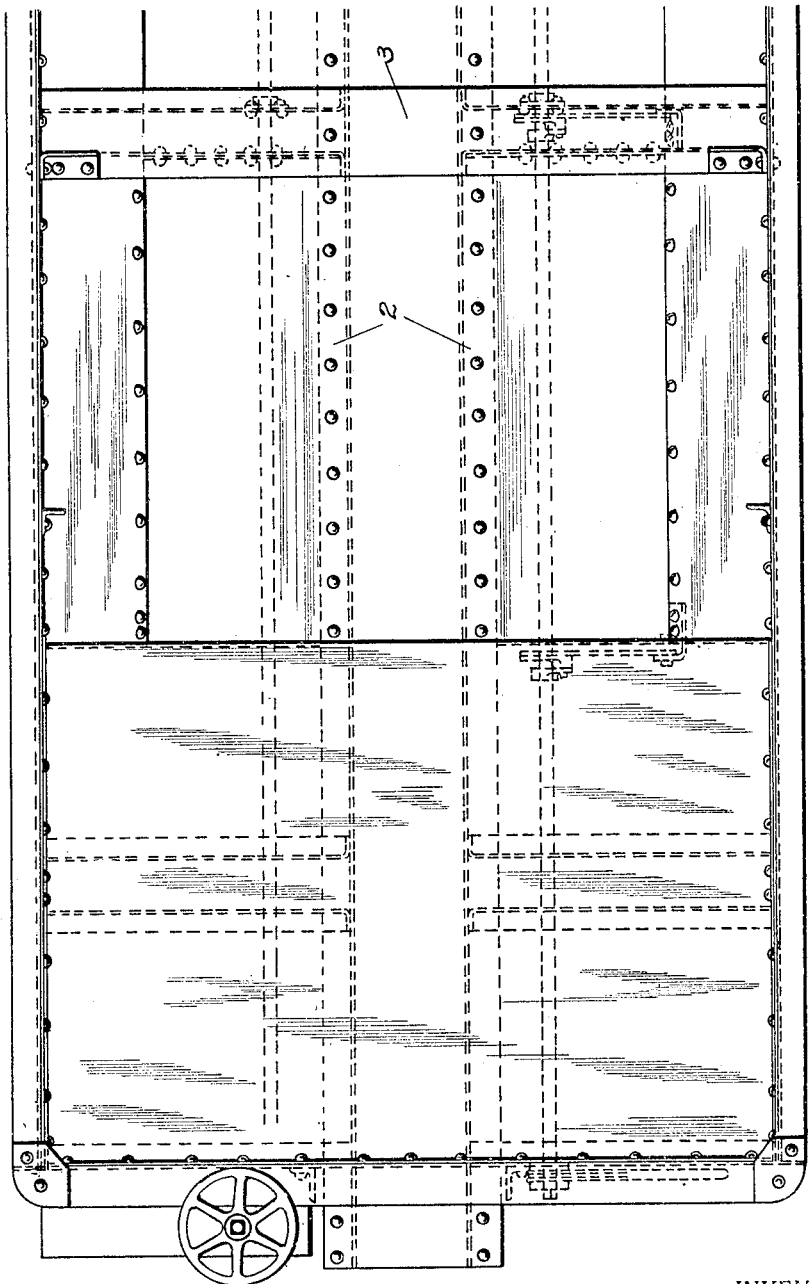
Figure 2:
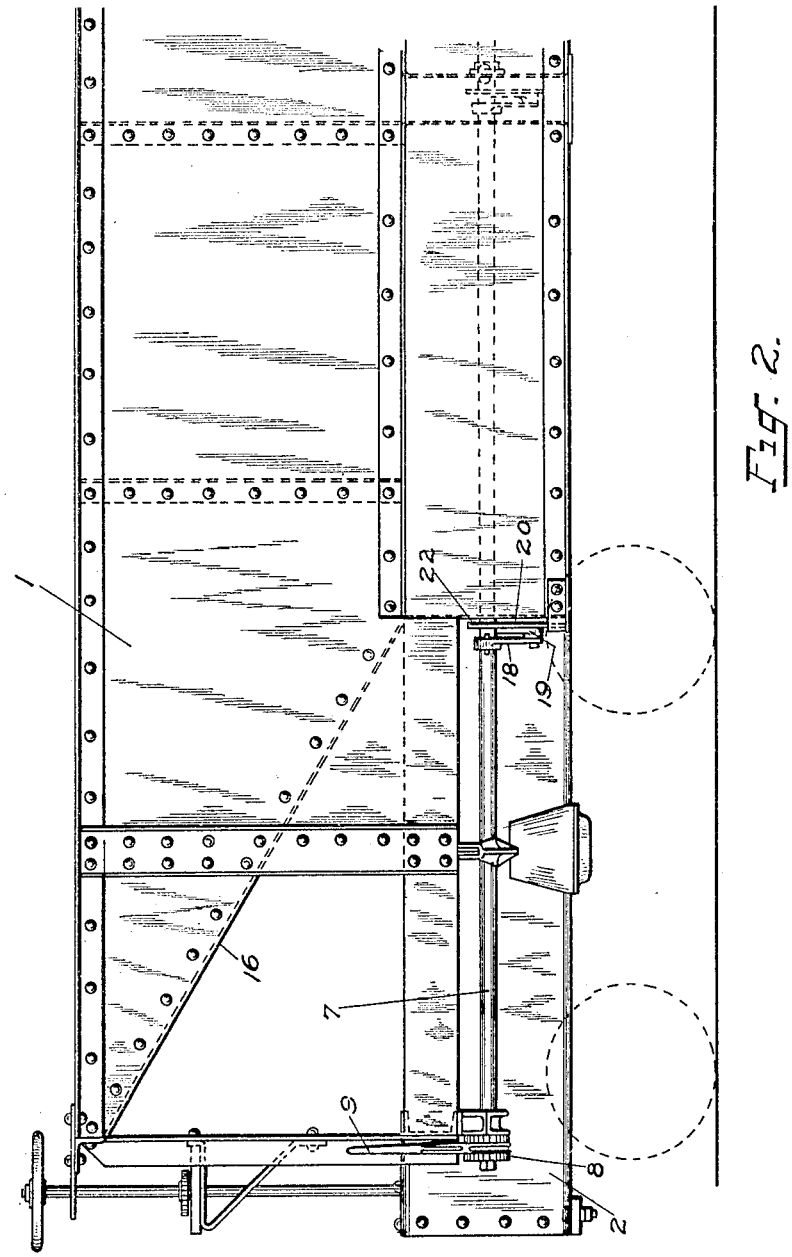
Figure 3:
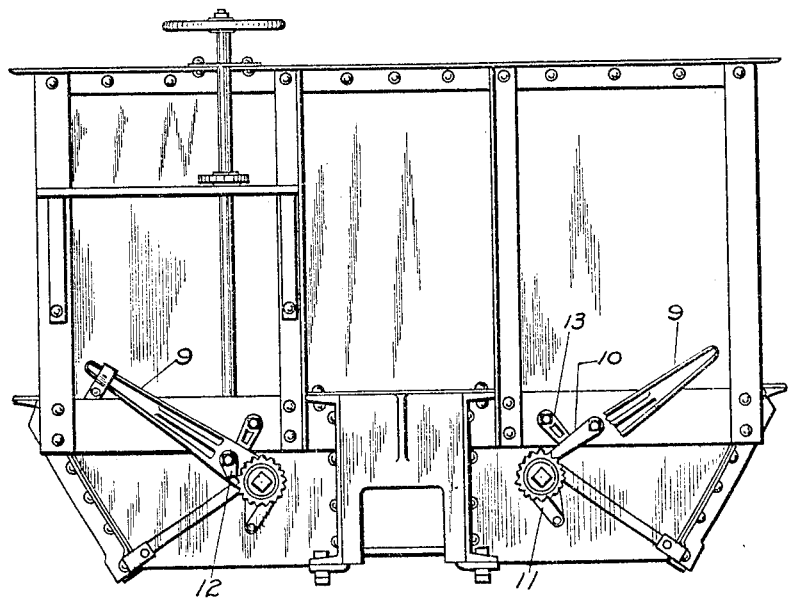
Figure 4:
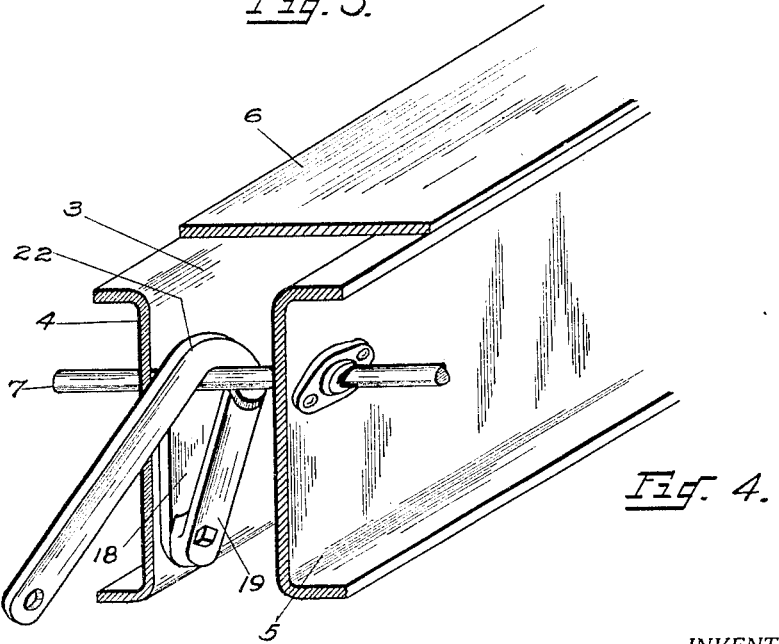
Figure 5:
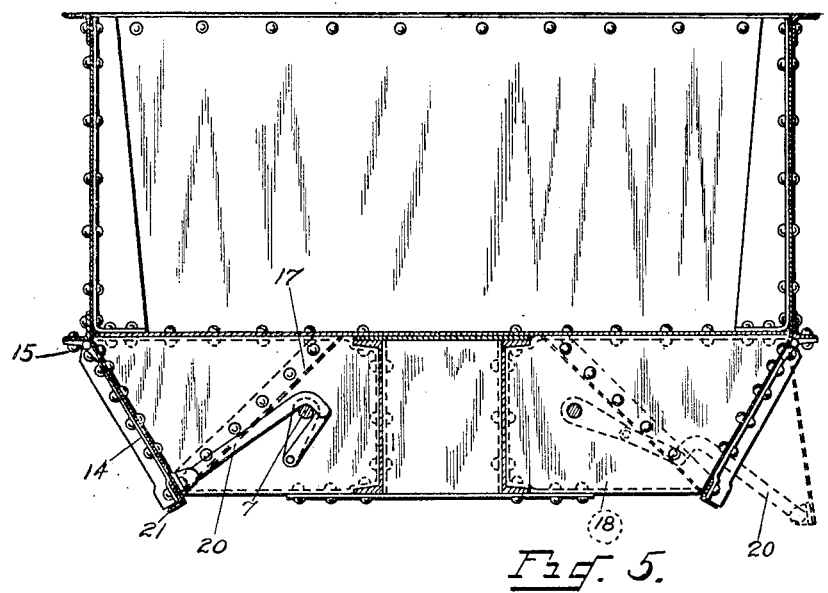
Figure 6:
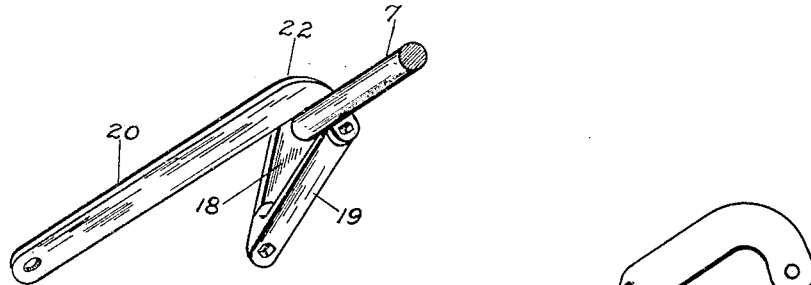
Figure 7:
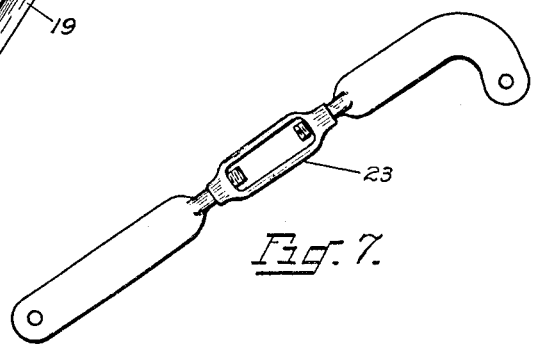

In the drawings which are hereto attached and hereby made a part of this specification, Figure 1 is a plan view of a portion of a car containing my improvements; Fig. 2 is a side view of a portion of the car containing my improvements; Fig. 3 is an end view of a car showing the shaft operating construction; Fig. 4 is a perspective of my improvement in locking position showing also the manner of mounting the shaft; Fig. 5 is a vertical transverse section through the car showing my improvements in position thereon secured to the door; Fig. 6 shows the device locked over the shaft, detached from the car; Fig. 7 shows a take-up device used in connection with my improvement.

In the drawings in which the same numeral indicates the same part throughout, 1 represents the car body mounted upon the center sill construction 2, the bolster construction being shown at 3, formed of the oppositely turned channels 4 and 5 provided with the cover plate 6; on each side of the car I mount in appropriate hangers an operating shaft 7 having the ratchet 8 at its end, and the lever 9 mounted on said shaft 7 for rotating the same. Appropriate pawls 10, 11 and 12 are provided for the ratchet construction shown at 8, and the dog 13 is provided for holding the pawl 10 in contact with the ratchet; this feature of the construction is not new and therefore need not be described further.

The doors 14 are provided on opposite sides of the car, and are hinged at 15 to swing laterally; the body of the car or the car box proper is preferably rectangular in cross section, as clearly appears in Fig. 5, and is provided with the end slope sheets 16, and with the bottom slope sheets 17, by which construction the lading is held constantly against the doors 14, so that any degree of opening of the doors will tend to cause the lading to discharge, and it being the purpose of a car of this type to discharge the lading well outside of the track, the doors are made as shown to swing outwardly in order to open the same.

To control the movements of the doors 14, I provide the construction shown very clearly in Figs. 4 and 6, consisting of the rocker arm 18 on the shaft 7, which, when the door 14 is held in its closed position, will occupy the position shown in Fig. 4, but when the door is in its open position, the rocker arm 18 will occupy the position shown in Fig. 5 in dotted lines. Pivotally secured to the rocker arm at its free end is an extension bar 19, which is also secured to one end of the locking bar 20; said locking bar is secured to the door 14 at 21 in a preferred manner, and at its other end is bent to form the hook 22. This hook portion of the locking bar is constructed to engage the shaft 7 when the door is in its closed position, thereby holding or locking the door securely. When the door is in its open position, the locking bar 20 occupies the position shown in dotted lines in Fig. 5. After a period of use, the door and its operating parts may require some adjustment and to this end I have provided the turn-buckle 23 shown in Fig. 7, whereby the locking bar may be lengthened or shortened as required by the conditions of the operating parts.

Normally my improved locking construction comprises the three parts which I have designated the rocker arm, the extension bar and the locking bar, and these parts may be made a greater or less length as desired, or other parts may be inserted in the combination to increase the length of the door operating construction; the locking bar is constructed to embrace the shaft directly and no shoulder or hub need be provided on the shaft for engagement with the hook portion of the locking bar; neither do I need a shoulder or cam surface on the rocker arm for the purpose of receiving the hook portion of the locking bar, and therefore my locking construction is simpler and more cheaply constructed than other locking constructions in use. It will be noted that the operating shaft 7 is on a higher plane than the point of attachment of the locking bar 20 to the door 14, and that the pull on the door is therefore practically in a line at a right angle with the door when closed, whereby I more securely hold the door in its closed position.

When it is desired to open the door 14, the lever 9 is released, and the shaft 7 is rotated by the pressure of the lading upon the door, thereby carrying the rocker arm 18 with it; the outer end of this rocker arm describes the arc of a circle, and the extension bar 19 at the point where it is connected with the rocker arm, is likewise carried through the arc of a circle, and the extension bar is thereby brought into the position shown in Fig. 5 on the right hand side thereof, thereby permitting the locking bar 20 to travel outwardly, whereby the door is permitted to open. In closing the door, the lever 9 is turned to rotate the shaft 7 in the opposite direction, and the rocker arm being carried therewith, will draw the extension bar and the locking bar into the closed or folded position shown in Figs. 4 and 6, so that the hook portion 22 of the locking bar takes over the shaft 7 and is held thereon and the door 14 is thereby securely locked.

What I claim is:

1. In a dump car having side doors opening outwardly adjacent the bottom thereof, a door operating construction comprising a shaft mounted longitudinally of said car, a rocker arm on said shaft, an extension bar pivotally connected to said rocker arm, and a locking bar pivotally connected with said extension bar at one end and with a door at its other end, said locking bar being hook shaped at the end thereof which is connected to said extension bar, whereby said locking bar immediately hooks over said shaft when the door is drawn to its closed position, to lock said door.

2. In a dump car having side doors opening outwardly adjacent the bottom thereof, a door operating construction comprising a shaft mounted longitudinally of said car, a rocker arm on said shaft, a locking bar connected with said door at one end and having its opposite end formed into a hook, an extension bar pivotally connected to said rocker arm and to the inner end of said locking bar, and means for rotating said shaft to draw said locking bar, extension bar and rocker arm into a folded position, whereby said door is closed, and said hook on said locking bar is brought into immediate engagement with said shaft to lock said door.

3. In a dump car having side doors opening outwardly adjacent the bottom thereof, a door operating construction comprising a shaft mounted longitudinally of said car, a locking bar connected with said door at one end and having its other end hook shaped, a rocker arm carried on said shaft, an extension bar connected at one end to said rocker arm and to the other end to the hook shaped end of said locking bar, means for rotating said shaft to permit the extension of said rocker arm, extension bar and locking bar to open said door, and to compel the folding or contraction of said rocker arm and extension bar whereby the hook shaped end of said locking bar is brought into immediate engagement with the shaft to lock the door thereto in its closed position.

In testimony whereof I affix my signature in the presence of two witnesses.

FRANK L. IRWIN.

Witnesses:
 Geo. W. Rightmire,
 Horace S. Kerr.